No. 770,578. PATENTED SEPT. 20, 1904.
A. HEINTZE.
SAUSAGE MACHINE.
APPLICATION FILED NOV. 9, 1903.
NO MODEL. 3 SHEETS—SHEET 1.

Witnesses:
J. W. Garfield
A. V. Leahy.

Inventor:
Arno Heintze,
by W. S. Bellows
Attorney

No. 770,578. PATENTED SEPT. 20, 1904.
A. HEINTZE.
SAUSAGE MACHINE.
APPLICATION FILED NOV. 9, 1903.
NO MODEL. 3 SHEETS—SHEET 3.

Witnesses:
J. D. Yarfield
A. J. Leahy

Inventor,
Arno Heintze,
by Wm. E. Beens
Attorney.

No. 770,578. Patented September 20, 1904.

UNITED STATES PATENT OFFICE.

ARNO HEINTZE, OF HOLYOKE, MASSACHUSETTS.

SAUSAGE-MACHINE.

SPECIFICATION forming part of Letters Patent No. 770,578, dated September 20, 1904.

Application filed November 9, 1903. Serial No. 180,321. (No model.)

*To all whom it may concern:*

Be it known that I, ARNO HEINTZE, a subject of the Emperor of Germany, and a resident of Holyoke, in the county of Hampden and State of Massachusetts, have invented certain new and useful Improvements in Sausage-Machines, of which the following is a full, clear, and exact description.

This invention relates to improvements in a machine for filling cases with sausage-meat, and pertains more particularly to the mechanisms and devices which coöperate with the plunger that expels the sausage-meat from the cylindrical receptacle therefor through a contracted nozzle into the cases, said mechanisms or devices having for their objects to insure a slow and gradual forwardly-feeding movement to the plunger up to the limit of such movement and to automatically insure a cessation of the forward feeding movement to automatically establish conditions for a reversal of the movement of the plunger, whereby it is withdrawn to the outer end of the receptacle in readiness for removal to permit placing a new supply of meat in the receiver, whereupon the operation may be repeated.

Another object of the mechanism is to automatically insure the opening of the valve controlling the meat discharge at the nozzle preparatory to establishing the forward movement of the expulsion-plunger and to insure automatically the closing of such valve after the plunger has reached the limit of its forward movement, after which the receptacle is to be refilled.

Other objects for convenience and utility will be hereinafter rendered apparent in connection with the description of the machine.

The invention consists in arrangements and combinations of instrumentalities and in constructions of parts and devices, all substantially as hereinafter fully described, and set forth in the claims.

The improved machine is illustrated in the accompanying drawings, in which—

Figure 1:
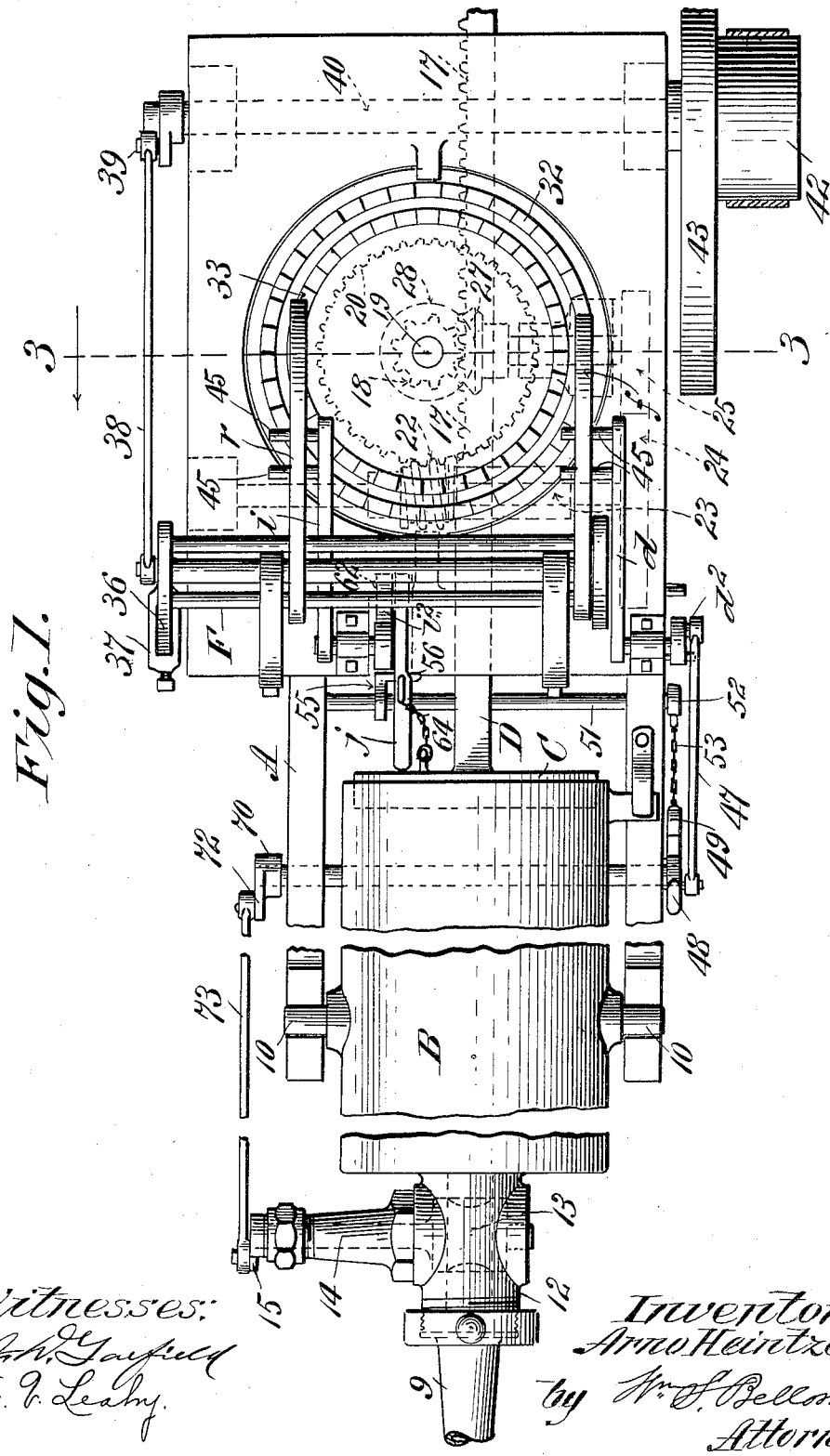
Figure 2:
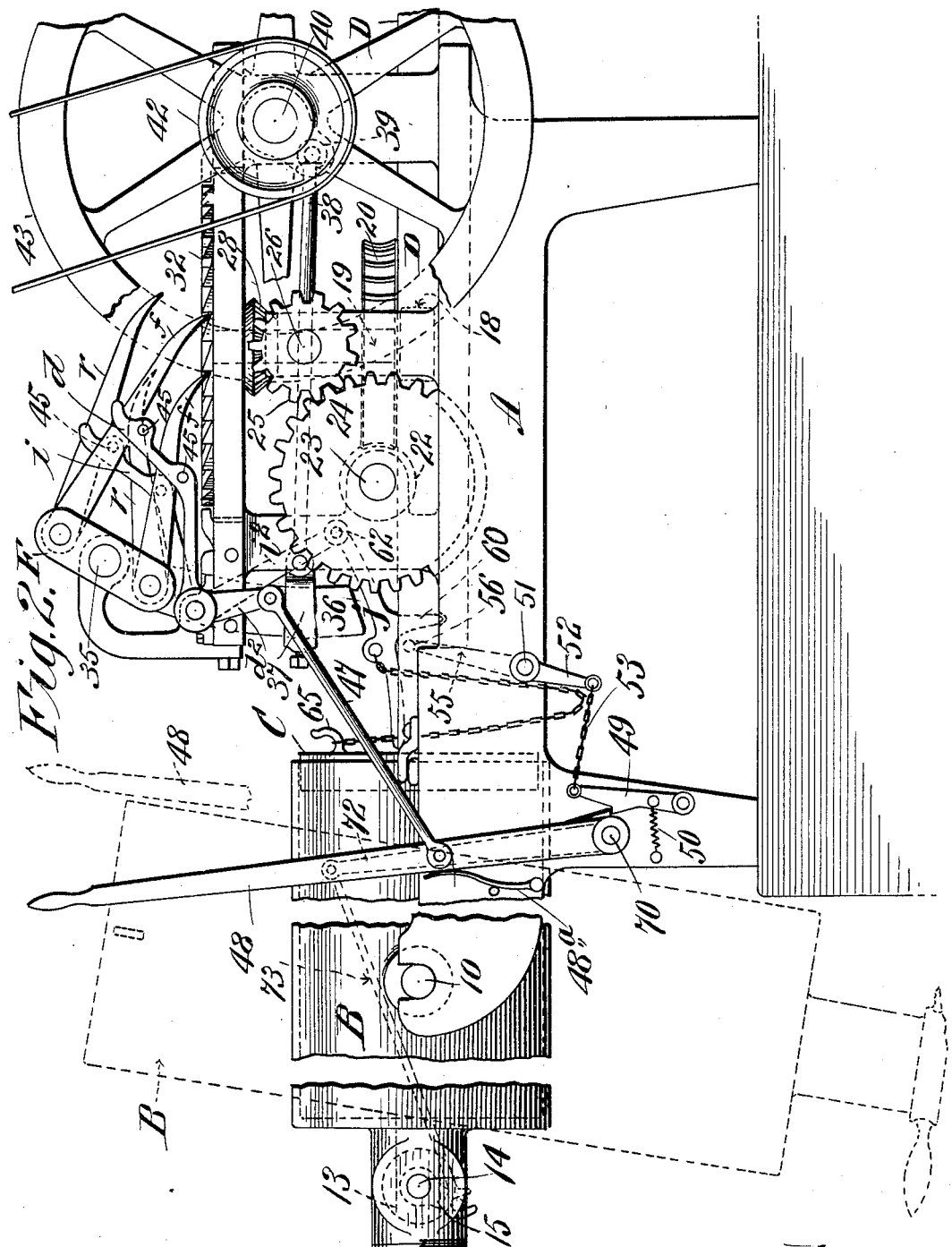
Figure 3:
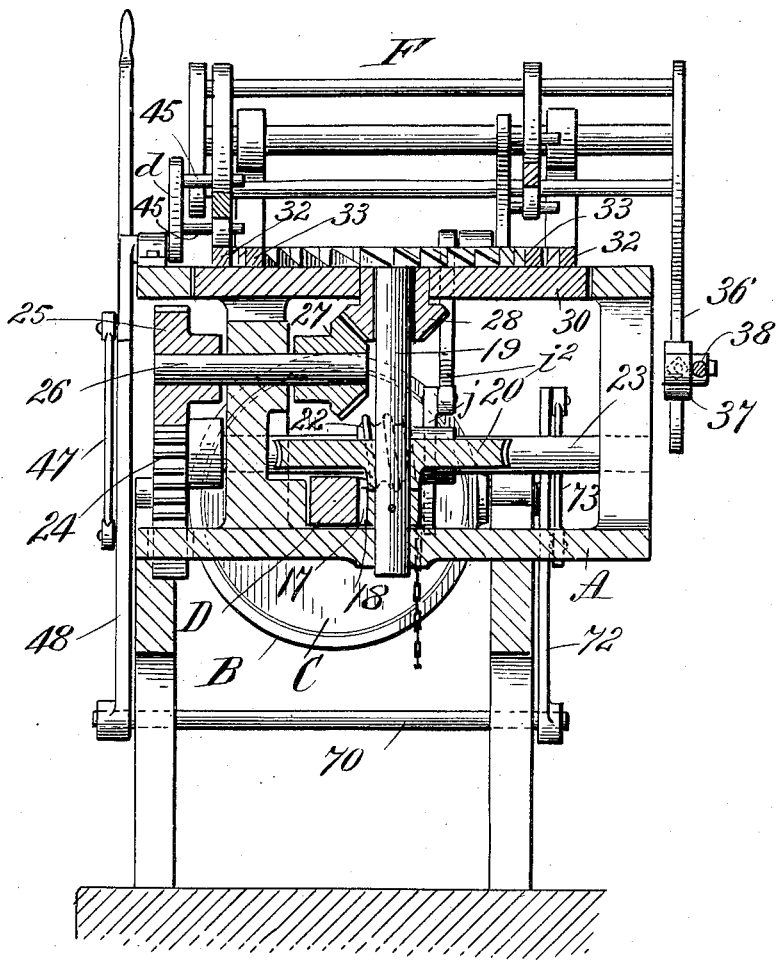
Figure 4:
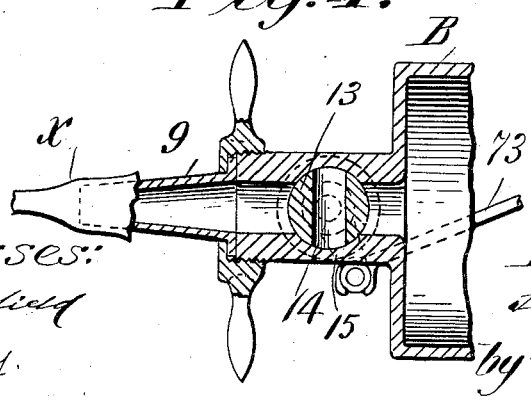

Figure 1 is a plan view. Fig. 2 is a side elevation. Fig. 3 is a vertical cross-section on line 3 3, Fig. 1. Fig. 4 is a central longitudinal sectional view through the valve-provided nozzle end of the cylindrical sausage-meat holder.

Similar characters of reference indicate corresponding parts in all of the views.

In the drawings, A represents a frame, which may be of any suitable material and constructed in any design having fitness for the purpose of supporting parts and mechanisms which constitute the invention. At one end portion of the frame is a cylindrical sausage-meat-holding receptacle B, having trunnions 10 10, whereby it may be normally supported in a horizontal position (shown by the full lines in the drawings) or swung into the upright position represented by the dotted lines in Fig. 2.

At the rear or inner end of the holder B is a movable head C therefor having the form of a cylindrical piston or plunger to fit the cylindrical chamber in the holder B, said plunger having the rod or bar D, to which forward feeding and reversing or withdrawal movements are imparted through the reversely-operable feeding means hereinafter described.

The holder B has a longitudinal passage through its contracted portion 12, in which is a shut-off cock 13, and has coupled at its extremity the tapered nozzle 9, on which an open end portion of one of the cases may be placed, as represented at $x$ in Fig. 4. The said cock has on its stem 14 a lever extension 15, with which automatic operating connections coöperate, as hereinafter described.

The aforementioned bar or rod D, which may be formed on the plunger C, is provided with rack-teeth 17 and is extended endwise to be subjected to the action thereon of the plunger-feeding mechanism, the location of which is at the other end of the machine from the meat-holder B.

Meshing with the teeth 17 of the rack-rod D is a spur gear-wheel or pinion 18, affixed at the lower end of a vertically-journaled shaft 19, which shaft has a worm-wheel 20 affixed thereon, in mesh with which is a worm 22 on a horizontally-mounted shaft 23, said shaft having a spur gear-wheel 24 at its end, meshing with which is another spur-gear, 25, on the axially-parallel and somewhat higher shaft 26, this latter shaft having at its inner end a bevel gear-wheel 27, which meshes with the axially-vertical bevel gear-wheel 28, which is journaled on the said shaft 19, which carries the rack-engaging pinion 18 aforementioned. The said bevel gear-wheel 28 is affixed to and depends below a horizontal disk or wheel 30, having an outer set of ratchet-teeth 32, operably contributing in the forward feed motion for the plunger C, and the inner set of ratchet-teeth 33, which operably contribute in the withdrawal movement of the plunger.

F represents a carrier for the pawls $f$ or a pair thereof for forward feed coöperative with the outer ratchet-teeth 32, and a pawl $r$ or a pair thereof which coöperate with the inner set of ratchet-teeth 33 when the plunger is to be retired. This pawl-carrier F is shown as constructed in the form of a frame centrally mounted at 35 on a horizontal axis transversely of the machine, this frame having the depending lever extension 36, with which is adjustably connected the yoke 37, provided at the end of a pitman-rod 38, which rod has connection with the crank 39 on the horizontally-mounted driving-shaft 40 of the machine, which is provided with the driving-pulley 42 and a balance-wheel 43.

$d$ represents a lifter for the pawl or pair of pawls $f$, and $i$ indicates a lifter for the pawl or pawls $r$, each of these lifters comprising a lever pivotally mounted near the respective pawl or pawls which it is to control and provided with an offset stud 45, engaging under each of the pawls of a set. It will be here stated that two or more of the pawls are preferably employed in a manner commonly practiced in pawl-and-ratchet mechanism for the avoidance of lost motion at each working thrust of the pawl-carrier.

The pawl-lifter $d$ has connected as one thereto the angularly-extending lever $d^2$, to which one end of a connecting-rod 47 is pivoted, the other end of such rod being pivoted to a lever 48, which is pivotally mounted on the side of the machine adjacent the holder B, and 49 represents a catch or detent-lever engaging the aforementioned lever 48, the same having a spring 50 for keeping it toward the lever and in its position of engagement.

$48^a$ represents a spring applied in a manner to swing the lever 48 from the position shown by full lines in Fig. 2 to the position indicated by dotted lines in the same figure.

51 represents a horizontally-mounted rock-shaft a short distance behind the rear end of the meat-holder, having the downwardly-extending lever 52, which by flexible connection 53 is connected with the aforementioned detent or catch 49. In a different vertical longitudinal plane from the location of the lever 52 is an upstanding lever or arm 55, fixed on the rock-shaft 51, having at its upper end an abutment 56, there being arranged vertically crosswise relatively thereto a depending member 60 of a bar $j$, one end of which at 62 is pivoted to the lever-arm $i^2$, which is pivoted to the lifter $i$ for reversing the pawl or pawls $r$. One end of the bar $j$ is extended into proximity to the end of the holder B, and a chain or equivalent flexible connection 64 has one end thereof attached to an eye-formed portion of the bar $j$, and its other end engages (as by having a link thereof encircling the hook 65) the plunger.

The aforementioned lever 48 is shown as affixed at one end of a rock-shaft 70, at the opposite end of which rock-shaft is also affixed a lever-arm 72, to which is pivoted one end of the connecting-rod 73, the other end thereof having connection with the aforementioned operating-lever extension 15 of the stem of the shut-off cock 13.

In operation, the holder having been filled while in its upright position and swung down to its horizontal position and the lever 48 brought to the leftward to the detent-engaged position represented in Fig. 2, the lifter $d$ for the feed-pawls $ff$ is through the connections 47 and $d^2$ so moved downwardly as to let the said pawls have their back-and-forth thrust movements in driving engagement with the outer set of the ratchet-teeth 32, (it being understood that at all times during the driving of the shaft 40 all of the pawls will have continuous back-and-forth movements whether effective or non-effective.) The impulses of the pawls $f$ at one side of the ratcheted disk imparts intermittent rotary movement to such disk in one direction, and its bevel gear-wheel 28 correspondingly drives bevel gear-wheel 27, shaft 26, gears 25 24, worm 22, work-wheel 20, pinion 18, and the rack-toothed rod D, which is meshed by said pinion, and consequently a slow feeding movement will be imparted to the plunger C, which will serve to expel the sausage-meat through the opened valved passage and nozzle into the cases. This feed movement desirably requiring some little time will be continued until the plunger has reached its working limit, whereupon the chain 64 will have drawn taut and will both upwardly and forwardly draw the bar $j$ for the twofold results of swinging the lever-arms 55 and 52, releasing the detent 49 and leaving the lever 48 free to be swung to the position of the dotted lines, whereby the lever $i$ for the feed-pawls $f$ elevates those pawls and renders them non-effective for further feeding movement, and the other result of the mentioned movement of the bar $j$ is to impart a lowering swinging movement to the lifter $i$ for the set of pawls $r$, so that these pawls may come into effect with the ratchet-teeth in the inner circle and at the opposite side of the disk from the location of the feed-pawls $f$, establishing a reversed driving of the feed motion, so that the plunger will be withdrawn from within the holder and be moved clear to the end and outside thereof, at which time the abutment by the plunger against the bar $j$ will move such bar to the rightward, correspondingly swinging lever $i^2$, elevating the lifter $i$, and throwing the reversing-pawls $r\ r$ out of action on the ratcheted disk. It will therefore be perceived that the machine is well controlled by hand through the lever 48 when all is in readiness for filling the case and automatically thereafter up to the extent of desiring again to start the plunger for another meat-expulsion movement.

It is apparent that this machine may be driven by any power which may be available and that no steam is required to be used in any manner to have intimate effect upon and to heat the meat and no parts of the machine requiring lubrication come in contact with the meat, as has been the case in some sausage-machines heretofore employed.

Having thus described my invention, what I claim, and desire to secure by Letters Patent, is—

1. In a sausage-machine, in combination, the cylindrical meat-holder, the plunger, having a rack-toothed rod, the wheel having concentric inner and outer sets of ratchet-teeth, a pawl-carrier mounted for oscillation and having pawls carried thereby and arranged for coöperation respectively with the outer and inner sets of ratchet-teeth, and at opposite portions of said ratcheted wheel, a driving-shaft having a crank, and a pitman-rod connected with the crank and said pawl-carrier, driving connections between said double-ratcheted wheel and said rack-toothed plunger-rod, lifters co-acting with the respective pawls, and devices for controlling the position of the pawl-lifters.

2. In a sausage-machine, in combination, the cylindrical meat-holder and its plunger having the rack-toothed rod, a shaft having affixed thereon a worm-wheel a rack-engaging pinion, and having loose thereon a bevel gear-wheel 28 and a disk therewith connected, a second shaft having secured thereon the bevel gear-wheel 27 and the gear-wheel 25, another shaft having secured thereon the worm and a gear-wheel in mesh with the one 25, and means for imparting intermittent rotational movements to the said disk.

3. In a sausage-machine, in combination, the cylindrical meat-holder and its plunger having the rack-toothed rod, of a shaft having thereon the affixed worm-wheel a rack-engaging pinion and having loose thereon a bevel gear-wheel 28 and a double-toothed ratchet-wheel therewith connected, a second shaft having secured thereon the bevel gear-wheel 27 and the gear-wheel 25, another shaft having secured thereon the worm and a gear-wheel in mesh with the one 25, reciprocatory pawls arranged to reversely drive the double ratchet-wheel in reverse directions, and shifters for said pawls whereby either thereof at one time may be in the ratchet-wheel engagement.

4. In a sausage-machine, in combination, the cylindrical meat-holder and its plunger having the rack-toothed rod, the wheel having the concentric outer and inner sets of ratchet-teeth, having a feed connection with said rod, an oscillatory pawl-carrier having a pawl $f$ for coöperation with one set of ratchet-teeth and having an oppositely-located pawl $r$ for coöperation with the other set of ratchet-teeth, the pawl-lifter $i$ coöperating with the second pawl and having a lever-arm $i^2$ and the bar $j$ connected thereto provided with an extension 60 and having a portion in proximity to the end of the meat-holder, a connection between said bar $j$ and the plunger, a device comprising oppositely-extended lever-arms 55 and 52, one of which has a position to be engaged by the projection 60, the pawl-lifter $d$, the lever 48 therewith connected, a spring applied to said lever, a detent for said lever, and a connection between said detent and the arm 52, for the purposes set forth.

Signed by me at Springfield, Massachusetts, in presence of two subscribing witnesses.

ARNO HEINTZE.

Witnesses:
 LEBRECHT G. HEINRITZ,
 WM. S. BELLOWS.